(12) United States Patent
Wild et al.

(10) Patent No.: US 12,333,114 B2
(45) Date of Patent: Jun. 17, 2025

(54) KITCHEN AND/OR CATERING DEVICE

(71) Applicant: Welbilt Deutschland GmbH, Eglfing (DE)

(72) Inventors: Hannes Wild, Riegsee (DE); Arndt Manter, Horgenzell (DE); Sebastian Siebert, Neubeuern (DE)

(73) Assignee: Welbilt Deutschland GmbH, Eglfing (DE)

( * ) Notice: Subject to any disclaimer, the term of this patent is extended or adjusted under 35 U.S.C. 154(b) by 0 days.

(21) Appl. No.: 18/389,318

(22) Filed: Nov. 14, 2023

(65) Prior Publication Data

US 2024/0160321 A1     May 16, 2024

(30) Foreign Application Priority Data

Nov. 15, 2022 (DE) .......................... 102022130189.3

(51) Int. Cl.
| | |
|---|---|
| *G06F 3/044* | (2006.01) |
| *F24C 7/08* | (2006.01) |
| *G06F 3/0362* | (2013.01) |

(52) U.S. Cl.
CPC .............. *G06F 3/044* (2013.01); *F24C 7/086* (2013.01); *G06F 3/0362* (2013.01)

(58) Field of Classification Search
None
See application file for complete search history.

(56) References Cited

U.S. PATENT DOCUMENTS

| | | | |
|---|---|---|---|
| 2018/0084937 A1* | 3/2018 | Joo .......................... | F24C 7/082 |
| 2020/0081557 A1* | 3/2020 | Togashi ................ | G06F 3/0362 |
| 2021/0375240 A1* | 12/2021 | Harrop ...................... | G10D 3/16 |

FOREIGN PATENT DOCUMENTS

| | | |
|---|---|---|
| DE | 102005049995 A1 | 4/2007 |
| DE | 102008020995 A1 | 10/2009 |
| DE | 102008043351 A1 | 5/2010 |
| DE | 102011007112 A1 | 10/2012 |
| DE | 102012210563 A1 | 12/2013 |
| DE | 102014113877 A1 | 3/2016 |
| DE | 102015105455 A1 | 10/2016 |
| DE | 102019001297 A1 | 8/2020 |
| DE | 102020001780 A1 | 9/2021 |
| EP | 2511807 A2 | 10/2012 |
| WO | 2018044118 A1 | 3/2018 |

OTHER PUBLICATIONS

German Search Report, German Patent Application No. 102022130189.3, Sep. 8, 2023, 1 pg.
European Search Report, European Patent Application No. 23208715.5, Apr. 10, 2024, 10 pgs.

* cited by examiner

*Primary Examiner* — Stephen T. Reed
(74) *Attorney, Agent, or Firm* — LOZA & LOZA, LLP; David S. Sarisky

(57) ABSTRACT

A kitchen and/or gastronomy device, in particular a cooking device, comprising a control unit, a touch display connected to the control unit, and a turning unit with a knob, which can be turned by the user around a Z-axis for executing a user input, and with at least one touch element arranged at the knob for swiping and thereby actuating the touch display; wherein the turning unit is fixed on a surface of the kitchen and/or gastronomy device.

17 Claims, 5 Drawing Sheets

KITCHEN AND/OR CATERING DEVICE

CROSS-REFERENCE TO RELATED APPLICATION

This application claims priority to German Patent Application No. DE102022130189.3, entitled "Kitchen and/or Gastronomy Device" and filed on Nov. 15, 2022, which is expressly incorporated by reference herein in its entirety.

BACKGROUND

The invention relates to a kitchen and/or gastronomy device, in particular a cooking device, with a touch display.

SUMMARY

It is the object of the present invention to provide a kitchen and/or gastronomy device, which is user-friendly and easy to manufacture.

The object is solved by the features of the independent claim. Preferred embodiments of the invention are the subject matter of the dependent claims.

The invention discloses a kitchen and/or gastronomy device. In particular, this device is adapted for commercial use in gastronomy or for domestic use in a kitchen. Preferably, it refers to a food treatment device, in particular a cooking device. However, the presented invention can also be applied to other devices with a touch display, for example a dishwasher or a refrigerator.

The kitchen and/or gastronomy device comprises a control device. A touch display is connected to this control device. The control device can output information to a user via the touch display and can receive corresponding user inputs via the touch display. The control device is adapted to control a unit of the kitchen and/or gastronomy device based on the user input. For example, it can refer to a heating unit or an air circulation unit.

In particular, the touch display is disposed on a surface of the food treatment device and forms part of this surface, preferably with a pane covering the touch display. Wherein the touch display can be a so-called multi-touch unit. Such systems can recognize and process multiple simultaneous touches and analyze changes in the direction of the touch correspondingly. This technology is used to recognize gestures and enable swiping. Swiping is used, for example, to turn pages. This technology can also be used to scale or turn displayed elements, for example. The term multi-touch is usually also used with the system's ability to recognize gestures, for example when swiping is used to scroll through pages. With regard to the functioning of the touch display and gesture recognition, reference is made to publication DE102008020995A1, the content of which is included here.

Furthermore, the kitchen and/or gastronomy device comprises a turning unit. This turning unit comprises a knob. The knob is rotatable by a user around a Z-axis so as to execute a user input. The information is transmitted from the turning unit, in particular from the knob, to the control device not via a cable connection or a radio connection, but—in particular exclusively—via the touch display. For this purpose, at least one touch element is disposed at the knob, which is adapted for swiping the touch display and thus for actuating the touch display. For this purpose, the touch element can touch the touch display or the pane covering the touch display and slide on it, or the touch element is guided via the touch display with a correspondingly small distance. In both variants, it is possible for the touch display to detect the touch element, so that the user input can be made.

It is preferably provided that the turning unit is firmly fixed on the surface. It should be noted that the "surface" can be formed both by the touch display (or the pane resting on it) and by the surrounding portion of the touch display. The "firmly fixing to the surface" thus describes the fixing of the turning unit on the touch display, next to the touch display, or partly on the touch display and partly next to the touch display.

"Firmly fixed" is understood to mean that at least part of the turning unit—for example the base, which is still to be described—cannot be removed from the surface during actuation and in particular also during cleaning of the device. Rather, at least part of the turning unit, remains permanently fixed to the surface. Particularly preferably, at least this part of the turning unit can only be detached from the surface in a destructive manner.

As mentioned, the turning unit can comprise a base, which is fixed to the surface. The knob is rotatably mounted on this base. According to one variant, it is provided that the knob cannot be removed from the base for actuating the touch display, in particular also not for cleaning. According to another variant, it is provided that the knob remains at the base for actuating the touch display and can be removed from the base for cleaning.

In an alternative design, the entire turning unit, in particular the base and knob, can be detached from the surface in a non-destructive manner and reattached to the surface, allowing the entire turning unit to be removed, for example for cleaning.

It is understood that the turning unit is fixed on and/or next to the touch display in such a way that when the knob is turning, the at least one touch element is movable via/across the touch display, so that user input into the control device is possible via the touch display. The advantage of the invention lies in the fact that a device with a touch display can be equipped with a turning unit in a very simple manner. It does not require any complex design changes, but only the turning unit has to be fixed on the surface.

Preferably, it is provided that multiple of the touch elements are arranged at the knob. The more of these touch elements are used, the more precisely the user input introduced via the knob can be detected.

The touch display preferably refers to a capacitive touch display. The at least one touch element, preferably each of the multiple touch elements, is adapted correspondingly to actuate the capacitive touch display.

For this purpose, it is provided in particular that the individual touch element comprises an electrically conductive element. This element is preferably electrically connected to the electrically conductive knob. When the user touches the knob, the grounding is made via the user, so that the capacitive touch display can be actuated in this manner.

The electrically conductive element of the individual touch element is preferably covered with a flexible housing.

Furthermore, it is preferably provided that the turning unit only partially overlaps with the touch display. In particular, it is provided that 20% to 80%, especially preferably 30% to 70%, of the surface of the turning unit projected perpendicularly onto the surface overlaps with the touch display. In this way, it can be achieved that a part of the touch display as small as possible is used for the turning unit, and a correspondingly large part of the touch display remains to be operated directly by the user via a finger input.

When using this partial overlapping, it is preferably provided that the at least one touch element, preferably each of the multiple touch elements, is/are arranged in such a way that when the knob is turning around the Z-axis, the individual touch element can swipe over the touch display and can be moved away from the touch display. For example, if the turning unit overlaps the touch display by 50% of its surface, the individual touch element can be moved over the touch display via a rotation of 180° and the touch element is moved outside the touch display via the next 180°.

When using multiple touch elements, according to one variant, it is provided that they all comprise the same distance from the Z-axis and/or are of the same design (in terms of size and geometry) and/or are distributed equally along the circumference.

However, for increasing the detection accuracy and robustness of the system and/or enabling turning position detection and/or turning direction detection, the following designs are preferably provided. These are advantageous in particular, when the pane on the touch display is dirty, for example.

Preferably, at least two touch elements comprise different distances from the Z-axis, so that in particular a turning position detection is possible. The position of these differently positioned touch elements on the touch display can be used to detect at which turning position, i.e., at which rotation angle, the knob is disposed. This can be used for a correspondingly designed user input.

Additionally, or alternatively, touch elements that differ from one another in size and/or geometry can preferably be used.

Additionally, or alternatively, the touch elements can preferably be distributed unevenly along the circumference.

As mentioned above, the turning unit can comprise a base. This is fixed to the surface. The knob is disposed on the base rotatably. The knob is preferably connected to the base via a base-knob connection. For example, the base-knob connection can comprise a latching-lug connection between the knob and the base.

As described above, it is provided that the turning unit, in particular both the base and the knob, is/are wirelessly connected to the surface. In particular, no wired connection is provided between the turning unit and the control device and also no wired connection is provided between the turning unit and the touch display.

Particularly preferably, the turning unit, in particular an underside of the base, is glued on the surface. Alternatively, or in addition to gluing, it is provided that the turning unit is welded and/or soldered and/or riveted and/or screwed onto the surface.

As already described, the touch display can be covered by a pane. This pane can also be larger than the touch display and thus protrude via the touch display. According to one variant, the turning unit is preferably glued on this pane.

Furthermore, the touch display can be surrounded by a frame. Thereby, it is not excluded that the touch display can also be covered by a pane. In particular, the frame is made of plastic or metal. Preferably, the turning unit, in particular the base, is glued to the frame.

As already mentioned, the knob is rotatable around the Z-axis for a corresponding user input. In particular, this Z-axis is perpendicular to the described surface.

During the rotation movement, the at least one touch element swipes the touch display—touching it or being guided very closely over the surface. The actuation of the touch display performed in this way is termed "swiping actuation" in the present document.

Detecting and/or evaluating the "swiping actuation"—in particular with the control device—can in principle be carried out in any way. For example, the "swiping actuation" can be detected like "swiping". When the touch display is not adapted for this purpose or swiping is not detectable for other reasons, the "swiping actuation" can also be detected by detecting multiple spaced-apart individual actuations of the touch display.

In one possible embodiment, the detection of "swiping" is deliberately avoided. Because impurities can get into the system, a swiping movement of the touch elements cannot be recognized reliably enough in all situations. Unambiguous detection by comparison with a reference signal enables detection even in unclean surroundings. For this purpose, the turning unit has symmetrically arranged touch elements, e.g., made of suitable soft components. For example, three portions (termed as touch fields) of the touch display are selected for evaluation and designed so that at least three touch elements overlap with the touch display at the same time. However, the distance between the touch fields must not be the same as the distance between the touch elements, so that, for example, one touch element overlaps exactly with a touch field and at the same time, another touch element only partially overlaps another touch field. The signal strength is determined at the upper most of the three touch elements overlapping with the touch display as a reference or zero value for the rotation movement. More important, however, is the determination of the time required in segment n (defined as the arc length between a first and a neighboring second touch field), from which the turning speed can be determined. To determine the turning direction, a third touch field is now integrated for evaluation; this third touch field is located asymmetrically between two touch elements of the turning unit. In this example, the arc length between the second and third touch field is therefore different, in particular shorter, than n.

Preferably, it is provided that the knob for executing a user input is not only rotatable, but can also be pushed parallel to the Z-axis. The knob can preferably be pushed against an elastic element, for example a spring.

This pushing of the knob parallel to the Z-axis is arranged to execute a "pushing actuation" of the touch display. Such a pushing actuation describes both the actual touching, in particular pushing, on the touch display, as well as bringing a touch element sufficiently close to the touch display in order to execute a user input.

Preferably, it is provided that the at least one touch element, preferably each of the multiple touch elements that is/are also used for the swiping actuation, is also formed for the pushing actuation of the touch display. This functions in particular by bringing the corresponding touch element closer to the touch display when the knob is pushed than during the swiping actuation—in particular, the touch element pushing on the touch display.

For this purpose, the flexible housing described above, which can cover the electrically conductive element inside the touch element and can be elastically deformed when the knob is pushed, is particularly advantageous.

In addition, or as an alternative to the flexible housing, it is preferably provided that the touch element, preferably each of the multiple touch elements, is/are adapted to be deformed by contact with the touch display during pushing actuation, wherein the deformation increases the contact surface of the touch element on the touch display, which in turn is detectable as pushing user input.

Both when pushing and when turning the knob, multiple touch elements can always be recognized simultaneously via the touch display.

Additionally, or alternatively, it is also possible to arrange at least one additional touch element at the turning unit. This at least one additional touch element can be moved sufficiently close to the touch display, in particular touching or pushing the touch display, by pushing the knob to perform a user input.

According to an advantageous explanation, the additional touch element is formed as rings at the knob—in particular radially within the touch elements. The ring is preferably recessed in depth relative to the touch elements. Preferably, the ring generates a signal on a specially defined portion of the touch display (also referred to as a separate touch field), which can be unambiguously assigned to the pushing actuation.

The ring is preferably solid and thus functions as an end stop, i.e., in particular the ring does not necessarily have to be compressible. This enables an end stop, which protects the turning unit from over pressing and resulting damage.

The ring also offers the advantage that the Z-axis movement, i.e., the pushing user input, is easily recognizable, because a relatively large surface is activating the touch display.

In particular, it is provided that the at least one additional touch element is further away from the surface than the at least one touch element in the idle state—i.e., when the knob is not pushed—and is thus recessed in depth.

Furthermore, it is preferably provided that the knob for executing a user input is slidable perpendicular to the Z-axis, preferably against an elastic element. It can be the same elastic element that also enables resetting the movement parallel to the Z-axis. Thus, a corresponding elastic element, for example a foam or rubber, can be disposed between the knob and the column, which enables displacement both parallel to the Z-axis and perpendicular to the Z-axis. When the knob is moved perpendicular to the Z-axis, the at least one touch element swipes the touch display—similar to the rotation movement, but not in a circle around the Z-axis, but perpendicular to the Z-axis.

The kitchen and/or gastronomy device is preferably adapted as a cooking device. In this case, the cooking device comprises a cooking chamber, in which food can be placed for treatment. Furthermore, the cooking device comprises a heating unit and/or an air circulation unit. The heating unit and/or the air circulation unit can be controlled by the control device. By moving the turning unit, in particular by turning the knob, a temperature can preferably be set and/or changed. Additionally, or alternatively, it is preferably possible to set and/or change a cooking program by moving the turning unit. A cooking program relates, for example, to the use of air circulation.

The invention further comprises a method for forming—i.e., for initially manufacturing or retrofitting—the kitchen and/or gastronomy device, wherein the turning unit is fixed, in particular glued, on a surface of the kitchen and/or gastronomy device. Before the turning unit is fixed, the kitchen and/or gastronomy device must of course not yet comprise a turning unit. In particular, it is a retrofitting process, in which an already used kitchen and/or gastronomy device is subsequently provided with the turning unit.

Preferably, it is provided that an assembly program of the kitchen and/or gastronomy device is started before fixing and the assembly program displays at least one positioning support for positioning the turning unit and/or for positioning a template on the touch display.

For the function of the touch display, which takes place in specific segments of the touch display, a precise assembly of the turning unit is required. There are various options for this. A template can be supplied for gluing the turning unit at the display, which is applied in the first step. The assembly program is started at the touch display and the template—e.g., by displaying three crosses as positioning support—is aligned and mounted there. The turning unit can then be securely fixed in a circular recess in the template, for example. This effort can be necessary, because the gluing surface of the turning unit is covered by itself.

Furthermore, for example, circular portions can be indicated as positioning supports, in which the turning unit can be glued.

It is also preferable to provide a view through the axis of the turning unit, for example by mounting a cap at the end of the turning unit. In this way, an axis point can be focused during gluing, when the cap is removed and can be hit relatively well.

Preferably, it is provided that a calibration program of the kitchen and/or gastronomy device is performed after fixing, wherein the user executes at least one movement on the turning unit predefined in the calibration program and the control device evaluates the signals detected at the touch display in order to calibrate the software stored in the control device in such a way that any deviation of the actual position of the turning unit from a target position is taken into account. Preferably, the at least one predefined movement to be executed by the user for calibration is displayed to the user at the touch display. Particularly preferably, a sequence of at least two movements to be executed for calibration is shown to the user at the touch display.

BRIEF DESCRIPTION OF THE DRAWINGS

Further details, advantages and features of the present invention will become apparent from the following description of an embodiment with reference to the drawings. It shows in.

DETAILED DESCRIPTION

Figure 1:
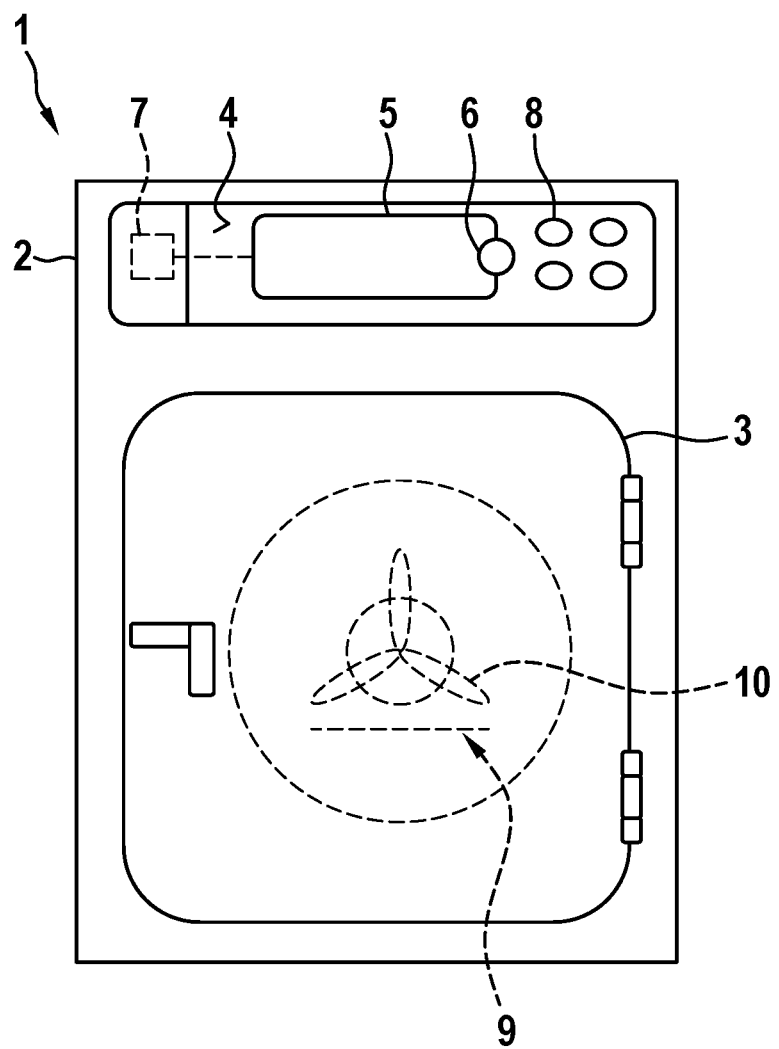
FIG. 1 a schematic view of a kitchen and/or gastronomy device of the invention according to an embodiment of the invention.

FIG. 1 shows a front view of a kitchen and/or gastronomy device 1 according to an embodiment. The kitchen and/or gastronomy device 1 is adapted as a cooking device for commercial use.

The kitchen and/or gastronomy device 1 comprises a housing 2. A cooking chamber is formed inside the housing 2, which can be closed via a cooking chamber door 3. A heating unit 9 and an air circulation unit 10 are disposed in or at the cooking chamber. The heating unit 9 and the air circulation unit 10 are controllable via a control device 7.

Furthermore, FIG. 1 shows purely schematically a surface 4 of the kitchen and/or gastronomy device 1. A touch display 5 is disposed on this surface 4, which together with a covering pane 18 (see FIG. 2) forms part of this surface 4.

The control device 7 can be controlled via user input to the touch display 5. In addition to the touch display 5, at least one further control unit 8 can be provided around the control device 7 as well.

The schematic representation in FIG. 1 shows that a turning unit 6 is disposed on the surface 4, partially overlapping with the touch display 5.

Figure 2:
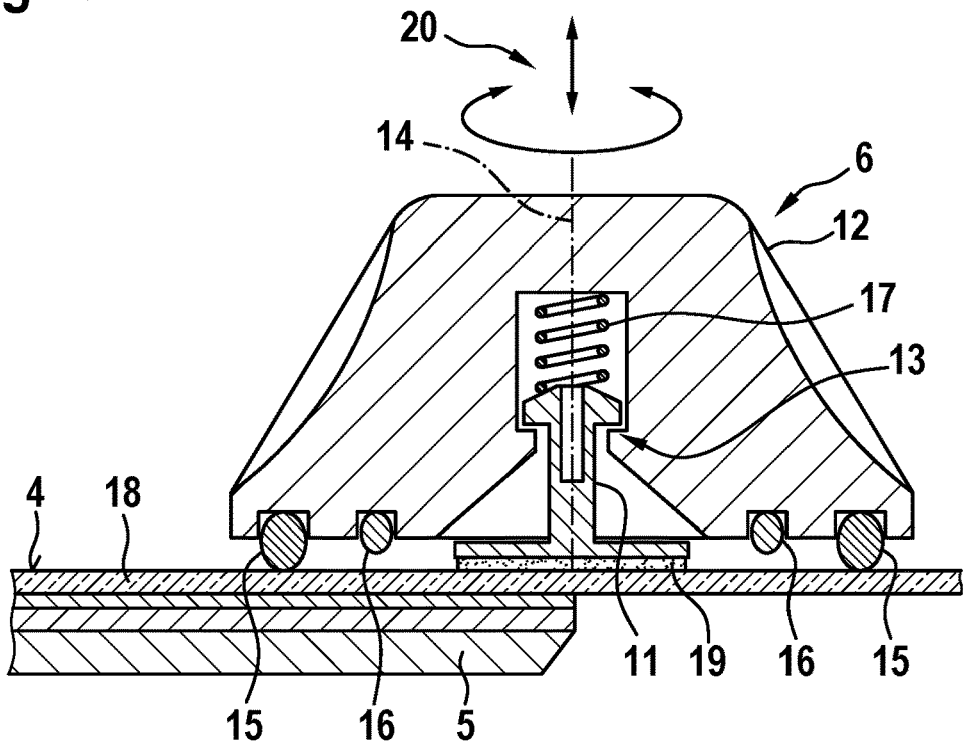
FIG. 2 a schematic sectional view of a turning unit of the kitchen and/or gastronomy device of the invention according to the embodiment.

FIG. 2 shows a schematic sectional view of this turning unit 6 on the surface 4. The surface 4 is formed here by the pane 18, for example a glass pane, with the touch display 5 underneath.

The turning unit 6 comprises a base 11. This base 11 is glued via a gluing location 19 on the surface 4, in the example shown on the pane 18.

A knob 12 of the turning unit 6 is plugged on the base 11. This knob 12 is rotatable around a Z-axis 14 relative to the base 11 perpendicular to the surface 4.

Multiple touch elements 15 are disposed on the side of the knob 12 facing the surface 4. By turning the knob 12 around the Z-axis 14, these touch elements 15 can swipe the touch display 5, thereby providing a user input 20 described in the general part of the description.

Radially within the touch elements 15 are disposed optional additional touch elements 16, which are spaced slightly further away from the surface 4 than the touch elements 15.

As the schematic representation in FIG. 2 illustrates, the knob 12 cannot only be turned around the Z-axis 14, but can also be pushed parallel to the Z-axis 14. This pushing movement can be detected via the touch display 5, because the additional touch elements 16 approach the touch display 5. Alternatively, however, it is also possible to design the turning unit 6 without the additional touch elements 16, wherein the pushing user input 20 can then be detected via the touch elements 15.

Furthermore, the schematic representation in FIG. 2 illustrates that the knob 12 is fixed to the base 11 via a base-knob connection 13 with latching lugs.

When the user input 20 is pushed, an elastic element 17 is compressed, which resets the knob 12.

Figure 3:
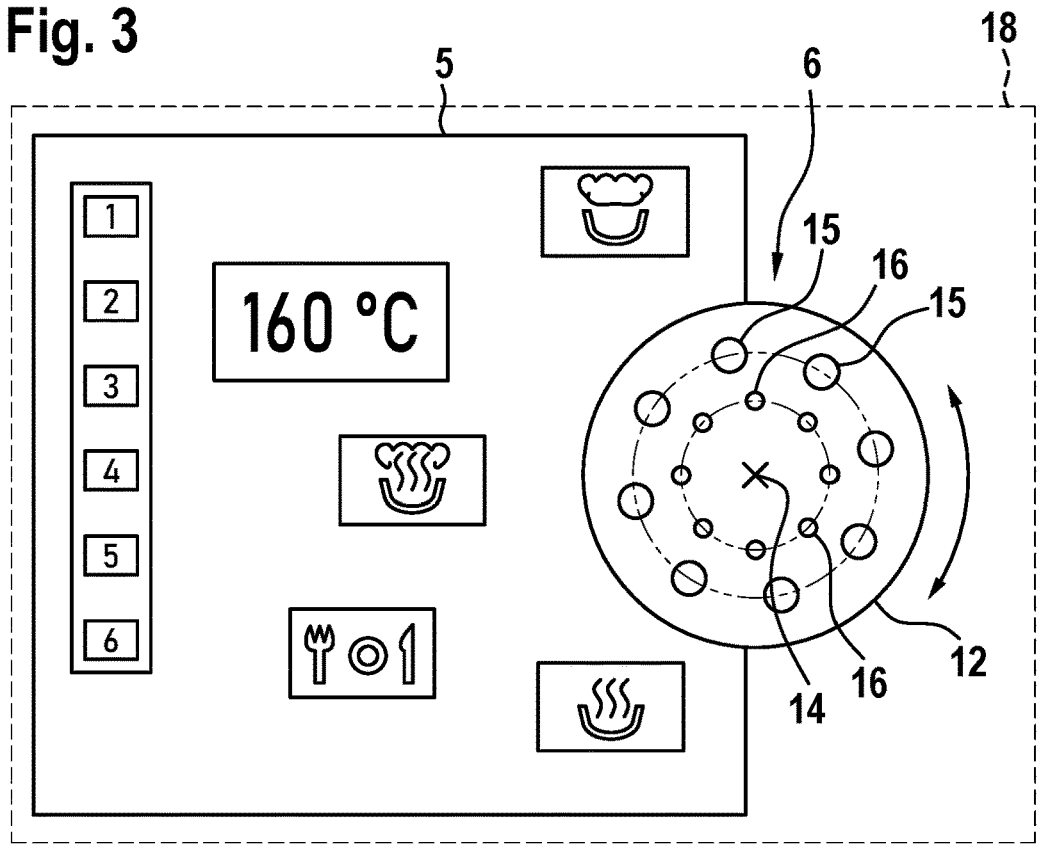
FIG. 3 a schematic top view of the turning unit of the kitchen and/or gastronomy device of the invention according to the embodiment.

FIG. 3 illustrates the positioning of the turning unit 6 relative to the touch display 5 in a schematic plan view. It is shown that the turning unit 6 overlaps with the touch display 5 by about 50% of the projected surface. Because several touch elements 15 and several additional touch elements 16 are arranged around the Z-axis 14, multiple of these elements 15, 16 are always disposed via the touch display 5, so that both the turning and the pushing user input 20 can always be detected without further ado.

FIG. 3 further illustrates by means of the symbols and figures that both the turning and the pushing user input 20 can be used, for example, to control the heating unit 9 with regard to the temperature and the air circulation unit 10 with regard to the cooking program.

Figure 4:
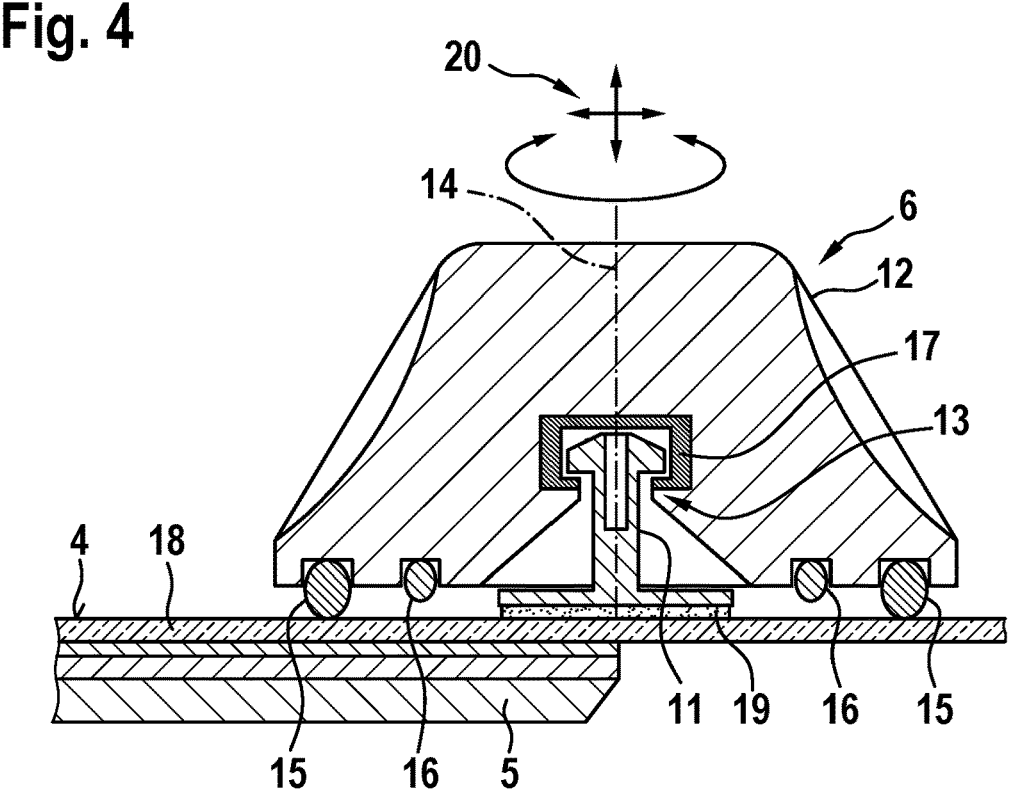
FIG. 4 a schematic sectional view of a variant of the turning unit from FIG. 2.

FIG. 4 illustrates a variant of FIG. 2 in schematic sectional view. FIG. 4 shows that the elastic element 17 between knob 12 and base 11 can be formed not only as a spring, but also as another elastic element 17, for example as foam or rubber.

According to FIG. 4, it is possible to turn the knob 12 relative to the base 11 around the Z-axis 14, to push it parallel to the Z-axis 14, and to push it perpendicular to the Z-axis 14. This sliding movement perpendicular to the Z-axis 14 can also be easily detected via the touch elements 15 and the touch display 5 and evaluated as user input 20 at the control device.

As explained in the general part of the description and illustrated in the figures of the embodiment, the turning unit 6 is connected wirelessly to the surface 4. In particular, only an information transmission from the turning unit 6 to the control unit 7 via the touch display 5 is provided.

Figure 5:
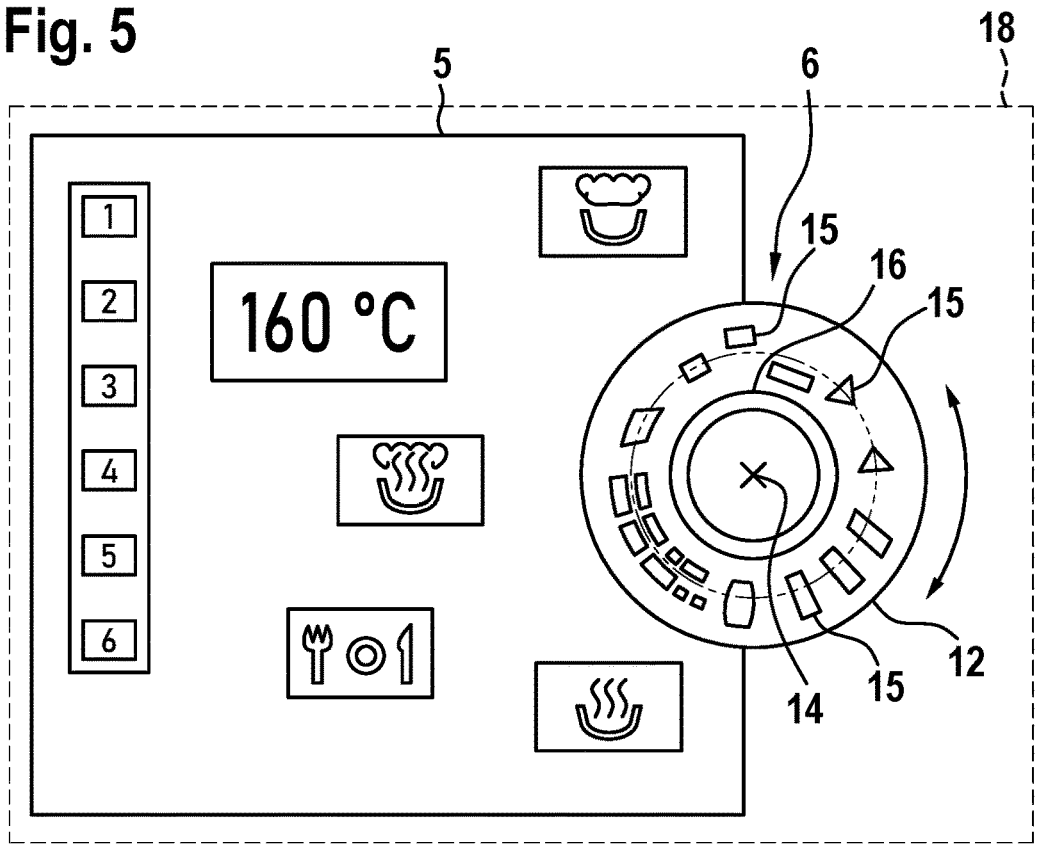
FIG. 5 a schematic top view of the turning unit of the kitchen and/or gastronomy device of the invention according to the embodiment to illustrate the optional use of touch elements with different sizes and geometries.

FIG. 5 shows a schematic top view of the turning unit 6 of the kitchen and/or gastronomy device 1 according to the embodiment to illustrate the optional use of touch elements 15 with different sizes and different geometries.

Furthermore, FIG. 5 shows the design of the additional touch element 16 as a ring, as explained in the general part of the description. This design as a ring can be used independently of the variants of the touch elements 15 shown.

Figure 6:
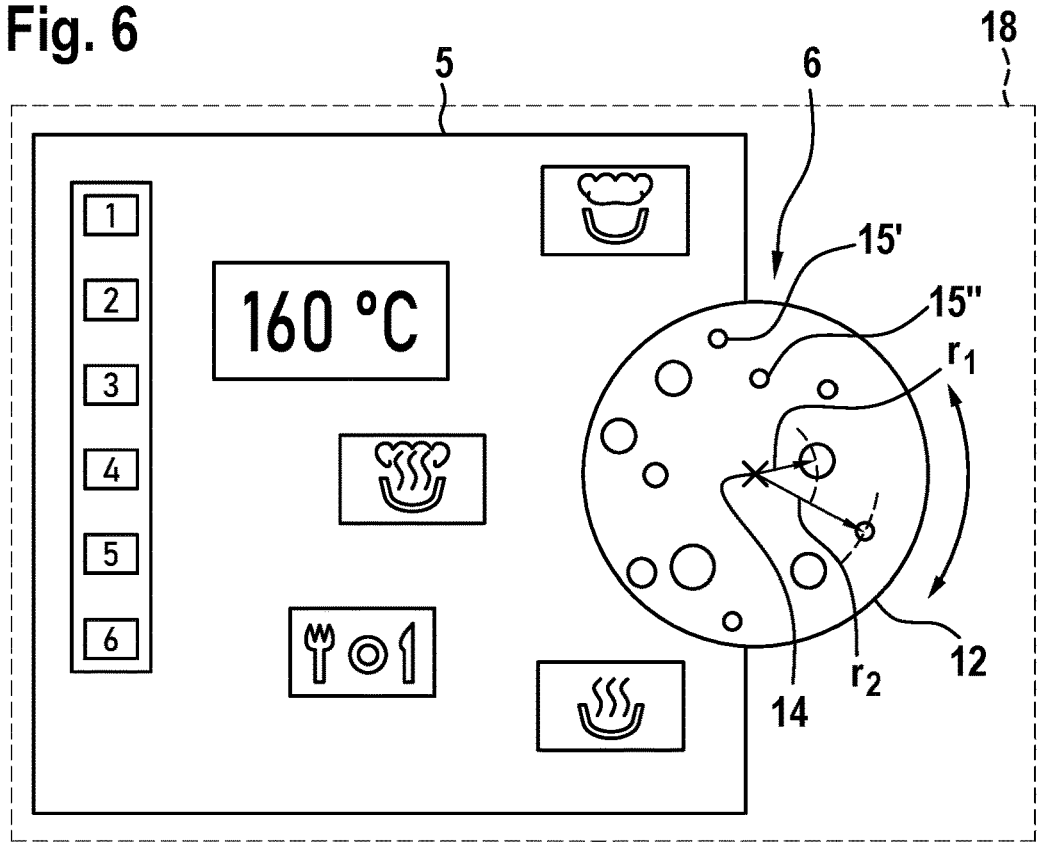
FIGS. 6 and 7 are schematic top views at different rotation angles of the turning unit of the kitchen and/or gastronomy device of the invention according to the embodiment to illustrate the optional use of unevenly distributed touch elements and/or touch elements of different sizes.
Figure 7:
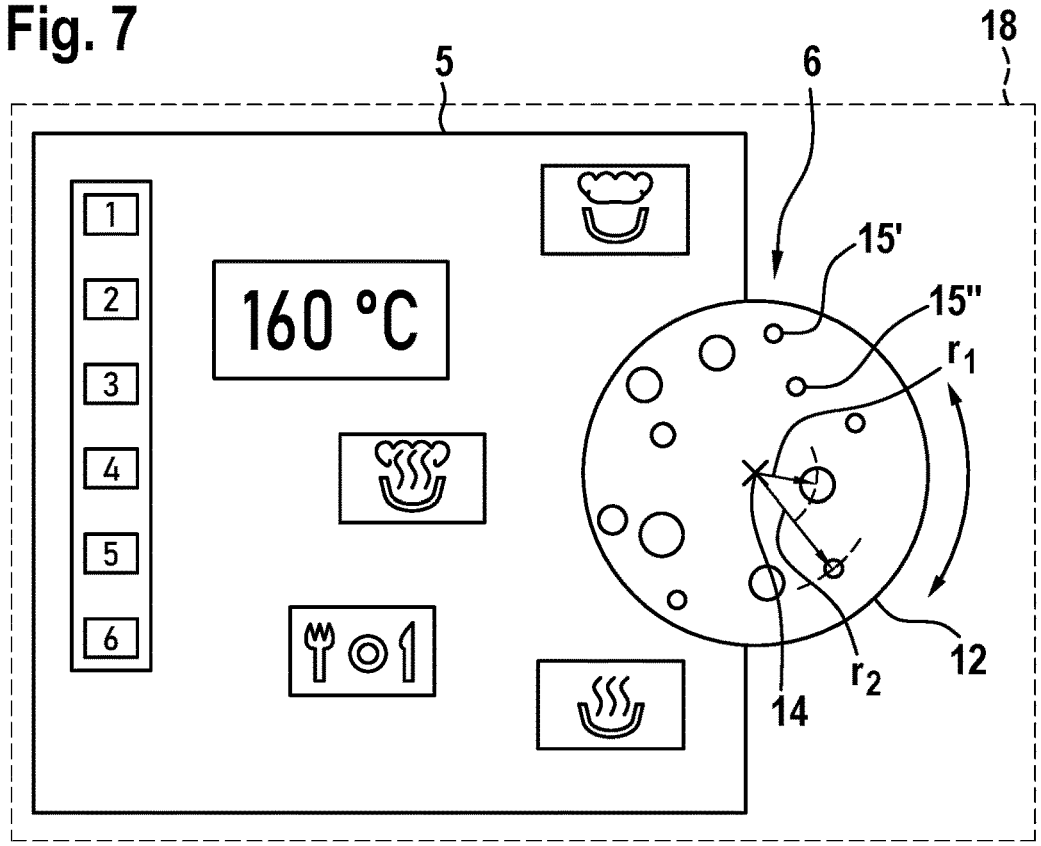

FIGS. 6 and 7 show the turning unit 6 of the kitchen and/or gastronomy device 1 at different rotation angles according to the embodiment to illustrate the optional use of unevenly distributed touch elements 15 and/or touch elements 15 of different sizes. This increases the accuracy and robustness of the system. For example, when dirt on the touch display 5 would be in the "orbit" on radius r1, then one has the option of forming an unambiguous detection on radius r2.

The advantage of touch elements 15 with different sizes, different geometries and/or uneven distribution is explained in the general part of the description and applies in particular to the embodiment.

Figure 8:
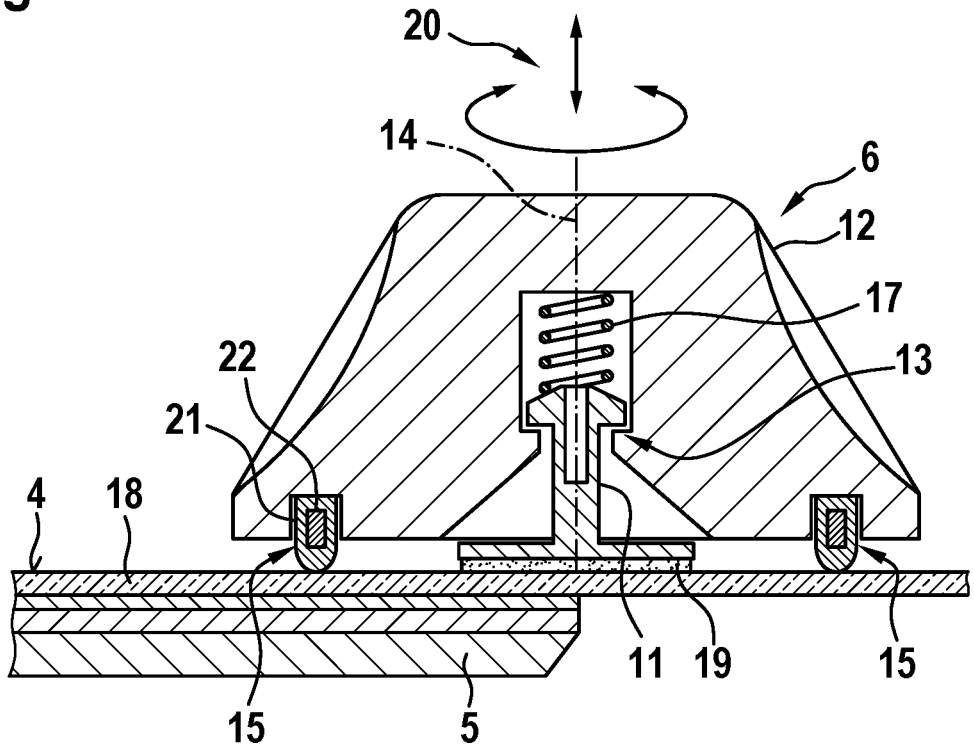
FIGS. 8 and 9 are two schematic sectional views of the turning unit of the kitchen and/or gastronomy device of the invention according to the embodiment as in FIG. 2; here with deformable touch elements.
Figure 9:
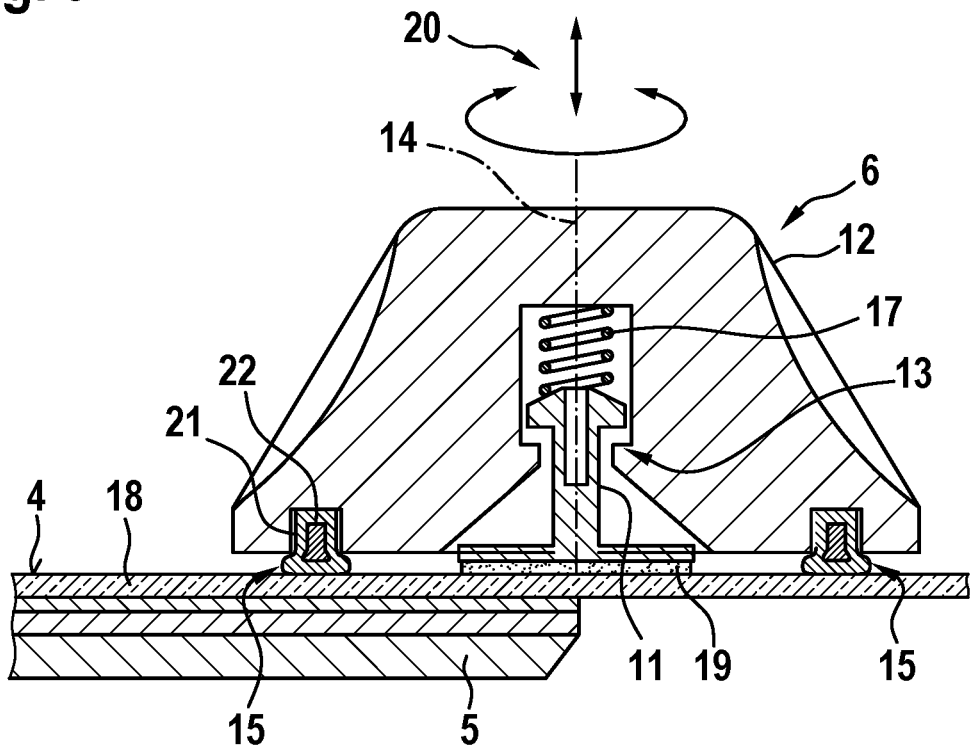

FIGS. 8 and 9 show two schematic sectional views of the turning unit 6 of the kitchen and/or gastronomy device 1 according to the embodiment as in FIG. 2; here, however, with deformable touch elements 15. In FIG. 9, the knob 12 is pushed in the direction of the touch display 5 compared to FIG. 8. The schematic illustration shows that the touch element 15 comprises a flexible housing 21, in which an elastically deformable electrically conductive element 22 is disposed. This optional type of touch element 15 is adapted such that it is deformed by contact with the touch display 5 during pushing actuation, wherein the deformation increases the contact surface of the touch element 15, in particular of the electrically conductive element 22, on the touch display 5, which in turn is detectable as pushing user input 20.

In addition to the above written description of the invention, explicit reference is hereby made to the graphic representation of the invention in all figures for the purpose of its supplementary disclosure.

What is claimed is:

1. A kitchen and/or gastronomy device, in particular a cooking device, comprising:
   a control device;
   a touch display connected to the control device; and
   a turning unit with a knob that can be rotated around a Z-axis for executing a rotating user input and that can be pushed along the Z-axis in the direction of the touch display for executing a pushing user input, and with at least one touch element arranged at the knob for swiping and thereby actuating the touch display in response to the rotating user input, and for pressing against the touch display in response to the pushing user input,
wherein the turning unit is fixed on a surface of the kitchen and/or gastronomy device, and the at least one touch element, preferably each of a plurality of touch elements, comprises an electrically conductive element and a flexible housing that is elastically deformable and covers the electrically conductive element.

2. The kitchen and/or gastronomy device of claim 1, wherein a plurality of touch elements are disposed at the knob.

3. The kitchen and/or gastronomy device of claim 1, wherein the touch display is a capacitive touch display, and the at least one touch element, preferably each of a plurality of touch elements, is adapted to actuate the capacitive touch display.

4. The kitchen and/or gastronomy device of claim 1, wherein the turning unit only partially overlaps with the touch display; in particular wherein 20% to 80%, preferably 30% to 70%, of an area of the turning unit projected perpendicularly onto the surface overlaps with the touch display.

5. The kitchen and/or gastronomy device of claim 4, wherein by rotating the knob the at least one touch element, preferably each of a plurality of touch elements, is movable across the touch display and away from the touch display.

6. The kitchen and/or gastronomy device of claim 1, wherein:
all touch elements have a same distance to the Z-axis or at least two, preferably more than two, touch elements have different distances to the Z-axis,
at least two, preferably more than two, of the touch elements differ in size and/or geometry, and/or
the touch elements are distributed unevenly along a circumference around the Z-axis.

7. The kitchen and/or gastronomy device of claim 1, wherein the turning unit comprises a base fixed at the surface, wherein the knob is rotatably arranged at the base.

8. The kitchen and/or gastronomy device of claim 1, wherein the turning unit is wirelessly connected to the surface; in particular, no wired connection is provided between the turning unit and the control device, and no wired connection is provided between the turning unit and the touch display.

9. The kitchen and/or gastronomy device of claim 1, wherein the turning unit is at least one of glued, welded, soldered, riveted, or screwed to the surface.

10. The kitchen and/or gastronomy device of claim 1, wherein:
the touch display is covered by a pane, and the turning unit is glued on the pane; or
the touch display is surrounded by a frame, in particular made of plastic or metal, and the turning unit is glued on the frame.

11. The kitchen and/or gastronomy device of claim 1, wherein the at least one touch element, preferably each of a plurality of touch elements, is formed for swiping actuation and for pushing actuation of the touch display.

12. The kitchen and/or gastronomy device of claim 1, wherein the turning unit comprises at least one auxiliary touch element arranged at the knob for contacting the touch display in response to the pushing user input; in particular wherein the auxiliary touch element is formed as ring around the Z-axis.

13. The kitchen and/or gastronomy device of claim 1, wherein the knob can be slid perpendicular to the Z-axis for executing a sliding user input.

14. The kitchen and/or gastronomy device of claim 1, formed as cooking device, comprising a cooking chamber and a heating unit controlled by the control device and/or an air circulation unit controlled by the control device, wherein a temperature and/or a cooking program is/are adjustable and/or changeable by rotating the turning unit.

15. A method for forming a kitchen and/or gastronomy device of claim 1, wherein the turning unit is fixed, in particular glued, on a surface of the kitchen and/or gastronomy device.

16. The method of claim 15, wherein an assembly program of the kitchen and/or gastronomy device is started before the fixing, and the assembly program displays on the touch display at least one positioning support for positioning the turning unit and/or for positioning a template.

17. The method of claim 15, wherein after the fixing, a calibration program of the kitchen and/or gastronomy device is performed, wherein a user executes at least one movement predefined in the calibration program at the turning unit, and the control device evaluates signals detected at the touch display in order to calibrate in such a way that a potential deviation of an actual position of the turning unit from a target position is taken into account; preferably wherein the at least one predefined movement, which is to be executed by the user, is displayed to the user at the touch display.

* * * * *